C. W. EARNSHAW.
SALES BOOK.
No. 10,619. Reissued July 7, 1885.
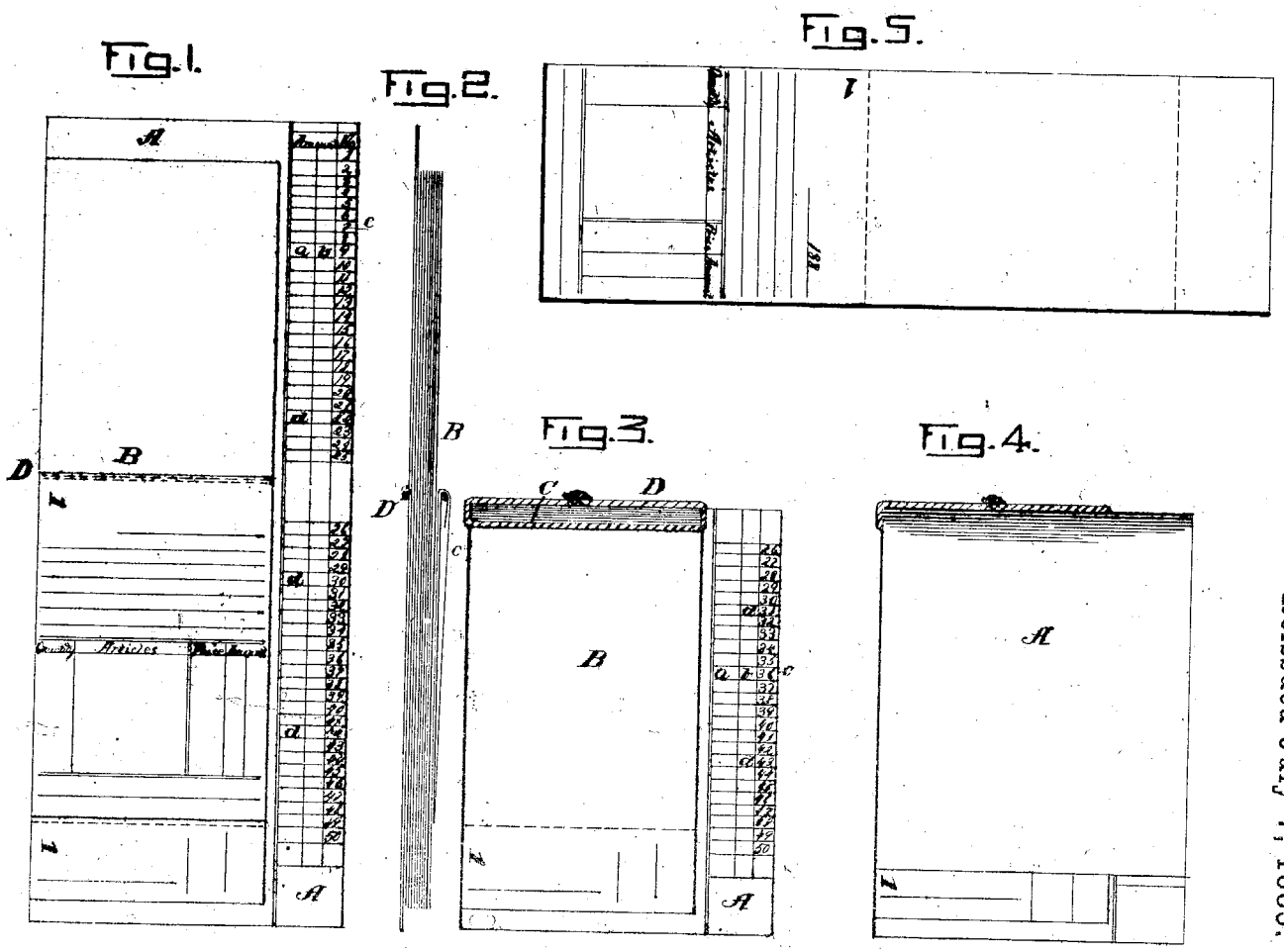
WITNESSES:
Louis A. Clark
J. Henry Stuart.
INVENTOR
Charles Wm Earnshaw
By W. A. Barlett
Atty.

UNITED STATES PATENT OFFICE.

CHARLES WILLIAM EARNSHAW, OF BOSTON, MASSACHUSETTS.

SALES-BOOK.

SPECIFICATION forming part of Reissued Letters Patent No. 10,619, dated July 7, 1885.

Original No. 283,872, dated August 28, 1883. Application for reissue filed February 13, 1885.

*To all whom it may concern:*

Be it known that I, CHARLES WILLIAM EARNSHAW, a citizen of the United States, residing at Boston, in the county of Suffolk and State of Massachusetts, have invented certain new and useful Improvements in Sales-Books, of which the following is a specification, reference being had therein to the accompanying drawings.

Figure 1 is a top or plan view, and Fig. 2 an edge view, of one of my improved sales-books as open. Fig. 3 is a horizontal section, and Fig. 4 a top or plan view, of it as closed. Fig. 5 is a view of the upper sheet of the pack of leaves bottom side of the book—that is, the side which is placed toward the cover.

The book in question is for use in large retail or other stores, and is to enable a salesman to rapidly produce a ticket or written statement of the goods, the price or amount of sales of such goods, a fac-simile copy of such statement, and, if required, an auxiliary statement, and to note on the cover of the book the amounts of the sales against numbers corresponding to those of the tickets or written statements.

In carrying out my invention I have on the inner face of the book-cover A, and usually close to one edge thereof, printed amount and number columns *a b c*, as represented, such columns being divided by transverse lines *d* into spaces for reception of the figures indicative of the numbers of the sales and cash received therefor. The divisions marked 1, 2, 3, &c., of the column *c* correspond in number to those of the sheets of the paper constituting the pack B of leaves of the book. In making the said pack, I take a suitable number of sheets of paper—as fifty, for instance—each being of proper length and width, and lay them together, one on another, in a pile or pack, after which I fold the pack transversely of it, near its middle, so that one portion of it shall lap on the other and extend thereon a distance short of the length thereof. Before folding the pack I lay upon its upper sheet a sheet, C, of transfer-paper, the lower or offsetting side of which is to be against the upper sheet of the pack, such sheet C being arranged as represented. I secure the pack and the transfer-sheet to the cover at the folds of the pack and cover by means of a string, D, extending transversely across the said sheet and cover and through the latter, so as to cause the pack and transfer-sheet to be held to the cover by a loop. The transfer-sheet will continue in connection with the cover as each sheet of the pack may be removed or torn out.

Each sheet of the pack may have printed on the under side of its upper leaf—that is, the part which turns over—suitable lines or columns and designating words, particularly such as to indicate "Quantity," "Articles," "Price," and "Amounts," &c., relating to a sale when made; and, besides, each sheet is to have its proper number marked or printed on it. An example of a sheet so printed is shown in Fig. 5. When the sheet is turned over in position for writing, this printed part comes uppermost and on top of the sheet of transfer-paper.

By having the upper portion of the pack shorter than the lower portion on which it laps a salesman can at once get access to the proper sheet and fold thereof preparatory to making a record thereon. This he could not so readily accomplish were the two folds of the pack of the same length.

In using the book, after opening the cover, the salesman first places his hand on the projecting part of the lower fold of the pack, and next pushes and turns the upper fold over upon the cover. Next he is to turn back upon the sheet of transfer-paper that portion of the upper sheet of the pack which then constitutes the upper leaf of the shorter fold. Next he writes on the upper surface of the part so turned back upon the transfer-sheet his account and particulars of a sale. A fac-simile of the writing will at the same time be produced on that part of the upper sheet upon which the transfer-sheet rests. Next, in case such may be desirable, he can also write a record on the lower part or fold of the upper sheet where it extends beyond the length of the upper fold. Opposite the sheet-number of the number-column of the cover and in the amount-column he next writes the amount in cash obtained for the goods or articles he may have sold. Next he removes or tears from the pack the sheet so written on, and disposes of it as may be necessary. The sheets of the pack he successively treats in manner as described, and writes in the amount-column of the cover the amount of cash for which the recorded sale may have been made.

I claim—

1. The sales-book, substantially as described, consisting not only of the cover provided with amount and number columns, but of the transfer-sheet and the pack of sheets arranged together and with and connected to such cover in manner as explained, and having the pack folded near the middle thereof, so as to cause the fold of it that may be resting on the cover to be longer or extend beyond the other or overlapping fold, as set forth.

2. A sales-book having its cover extended at the margin, said marginal extension being divided into spaces corresponding to the number of sheets in the book.

3. A sales-book having its sheets secured to the cover at one side of the center, and a transfer-sheet corresponding in size to the shorter leaf secured at the same place, so as to rest on top of the pile of sheets, substantially as described.

4. A sales-book having its pack of leaves folded near the middle thereof upon itself in such a way that the lower or bottom fold shall be longer than or extend beyond the other or overlapping fold, as set forth.

In testimony whereof I affix my signature in presence of two witnesses.

CHARLES WILLIAM EARNSHAW.

Witnesses:
OWEN McMANUS,
GEO. F. PINKHAM.